(12) United States Patent
Bailey

(10) Patent No.: US 7,499,021 B2
(45) Date of Patent: Mar. 3, 2009

(54) HAPTIC INPUT DEVICES

(75) Inventor: Ralph-Peter Steven Bailey, Nr Steyning (GB)

(73) Assignee: Makex Limited, West Sussex (GB)

( * ) Notice: Subject to any disclaimer, the term of this patent is extended or adjusted under 35 U.S.C. 154(b) by 295 days.

(21) Appl. No.: 10/432,039

(22) PCT Filed: Oct. 29, 2001

(86) PCT No.: PCT/GB01/04768

§ 371 (c)(1),
(2), (4) Date: May 19, 2003

(87) PCT Pub. No.: WO02/35457

PCT Pub. Date: May 2, 2002

(65) Prior Publication Data

US 2004/0040805 A1    Mar. 4, 2004

(30) Foreign Application Priority Data

Oct. 27, 2000  (GB) ................................. 0026355.8
Oct. 27, 2000  (GB) ................................. 0026356.6

(51) Int. Cl.
    *G09G 5/00*    (2006.01)
(52) U.S. Cl. .................................................... 345/156
(58) Field of Classification Search ................. 345/156, 345/174, 163–7, 163, 164, 167; 463/37–38
    See application file for complete search history.

(56) References Cited

U.S. PATENT DOCUMENTS

| 4,811,608 | A |   | 3/1989  | Hilton           |         |
|-----------|---|---|---------|------------------|---------|
| 4,961,267 | A |   | 10/1990 | Herzog           |         |
| 5,107,080 | A |   | 4/1992  | Rosen            |         |
| 5,143,505 | A |   | 9/1992  | Burdea et al.    |         |
| 5,401,128 | A | * | 3/1995  | Lindem et al.    | 409/132 |
| 5,573,088 | A |   | 11/1996 | Daniels          |         |
| 5,816,372 | A |   | 10/1998 | Carlson et al.   |         |
| 5,825,308 | A | * | 10/1998 | Rosenberg        | 341/20  |
| 6,211,861 | B1| * | 4/2001  | Rosenberg et al. | 345/163 |
| 6,839,663 | B1| * | 1/2005  | Temkin et al.    | 703/13  |
| 6,918,188 | B2| * | 7/2005  | McMurtry         | 33/558.2|
| 2002/0054011 | A1 | * | 5/2002 | Bruneau et al.  | 345/156 |

FOREIGN PATENT DOCUMENTS

WO    WO 97 12357 A    4/1997

* cited by examiner

*Primary Examiner*—Sumati Lefkowitz
*Assistant Examiner*—Tammy Pham
(74) *Attorney, Agent, or Firm*—Pablo Meles; Akerman Senterfitt

(57) ABSTRACT

A haptic input device comprises a hexapod or pentapod parallel linkage mechanism with force feedback effected by proportional control of magneto-restrictive fluid brakes constraining the measurement of the struts of the mechanism, through their base nodes. In the pentapod version of the haptic data input device, a haptic stylus is employed which includes an annular compliant feature that can be squeezed and whose squeeze pressure can be monitored.

7 Claims, 13 Drawing Sheets

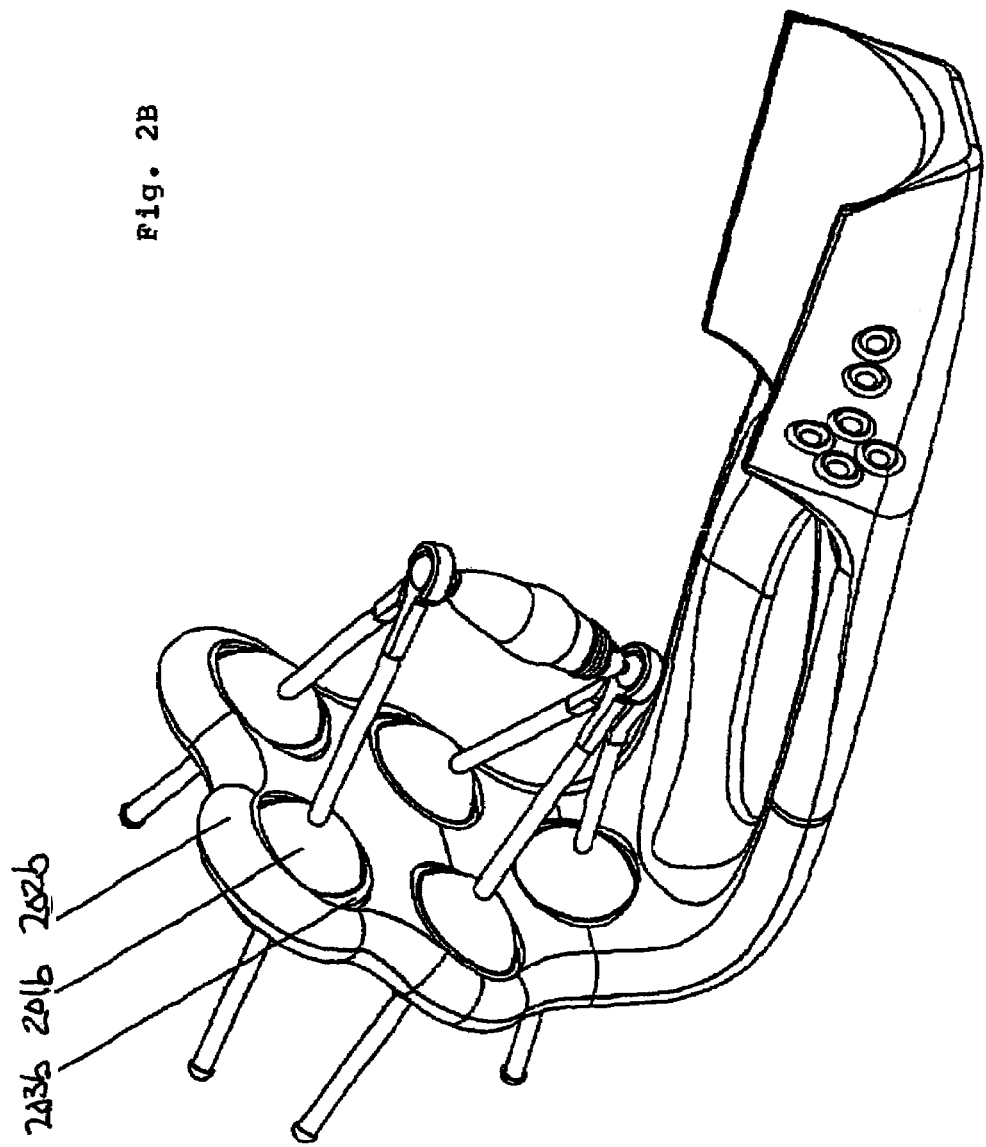

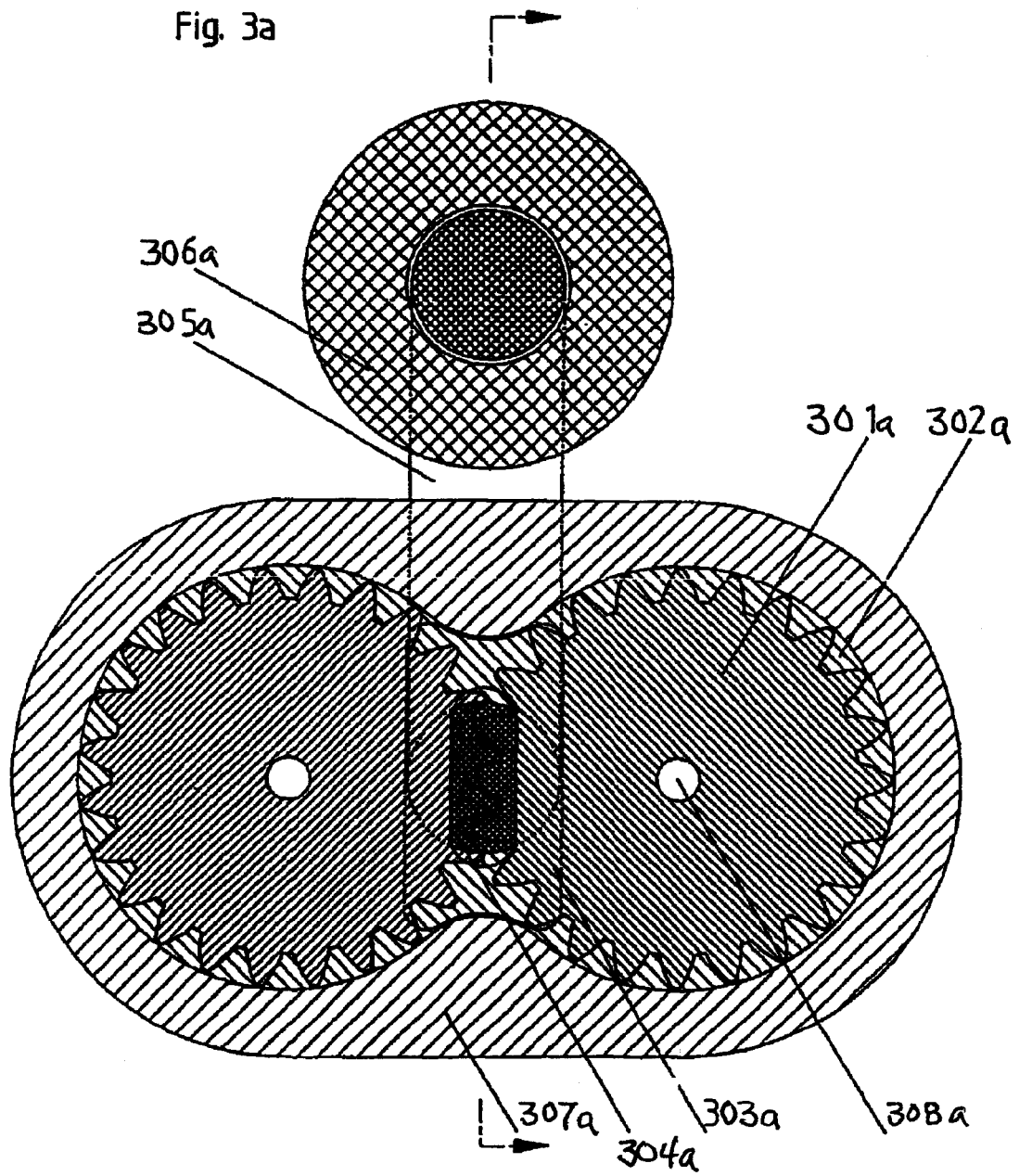

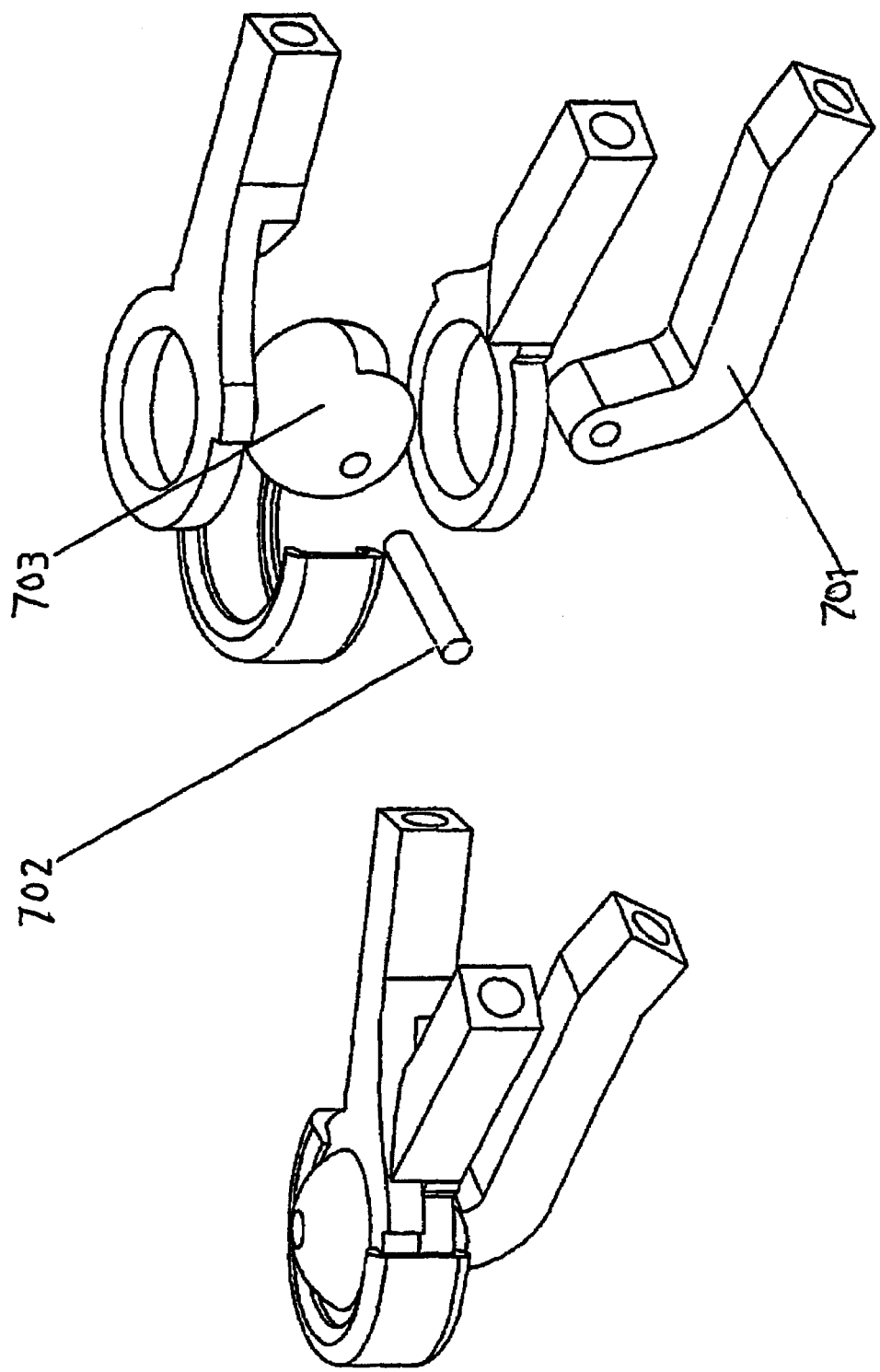

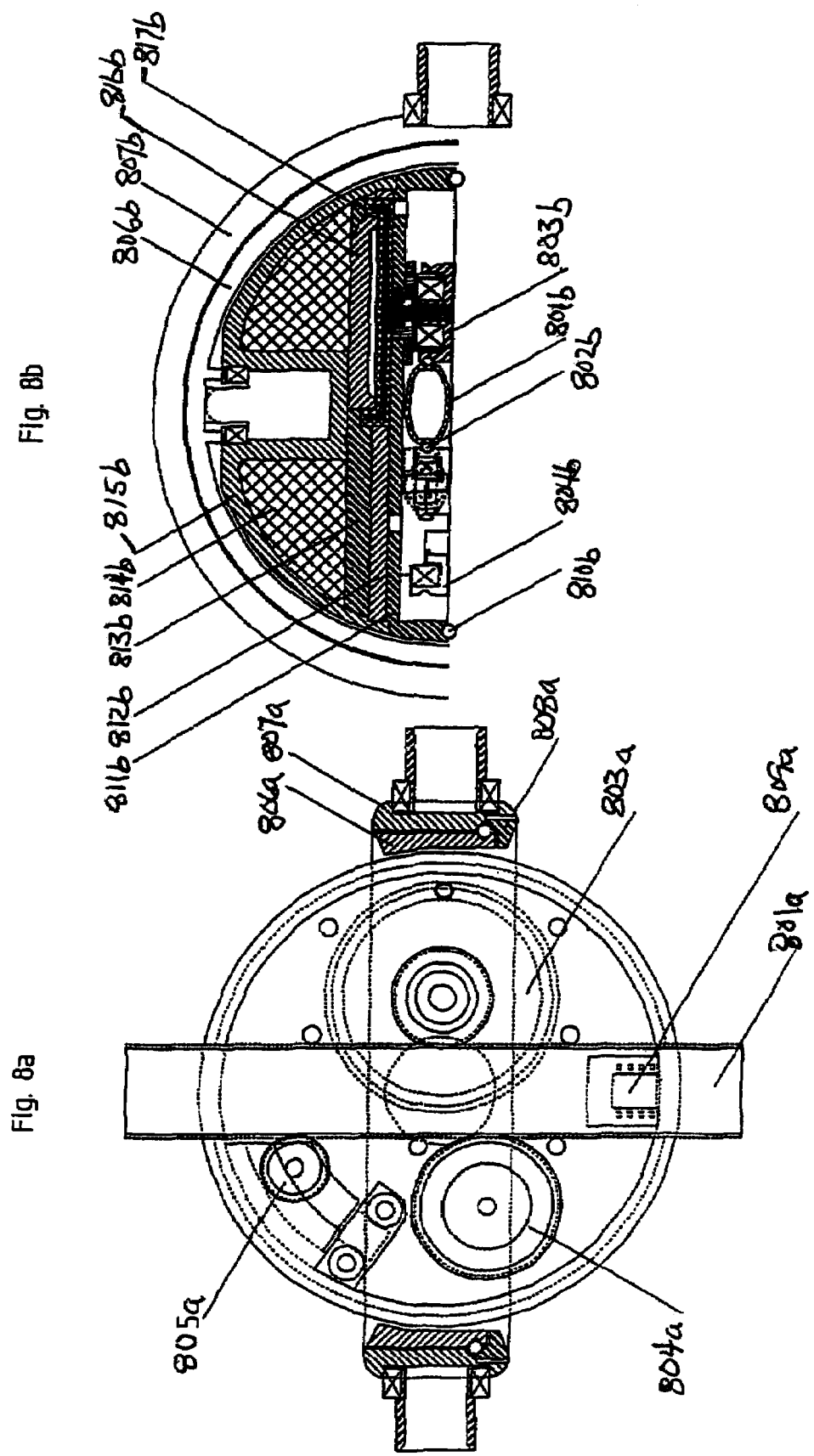

Fig. 9

Example 1– (absolute move only)

Cursor at stylus position

Model static

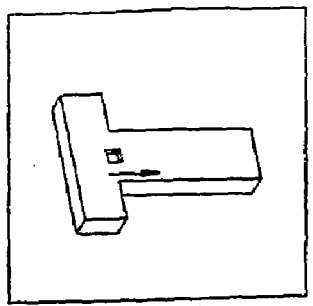

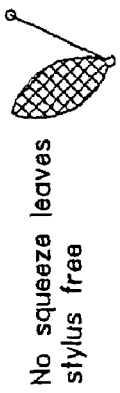

No squeeze leaves stylus free

Example 2 – (absolute move and some relative move).

Cursor follows stylus to new absolute tilt angle.

Forcing the stylus to tilt against haptic resistance defines rate of model rotation

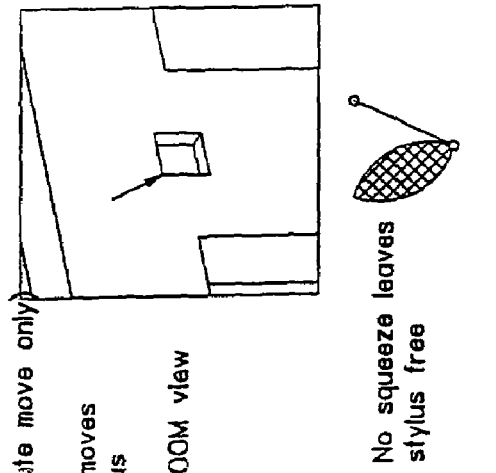

Modest squeeze causes modest resistance to tilt

Example 3 – (relative move only)

Cursor doesn't move

Inward pressure against stylus causes model view to ZOOM in

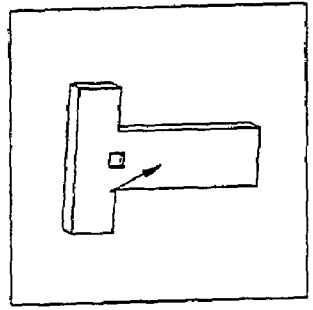

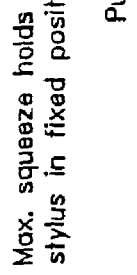

Max. squeeze holds stylus in fixed position

Example 4 – (absolute move only)

Cursor once again moves freely with the stylus

Model left in new ZOOM view

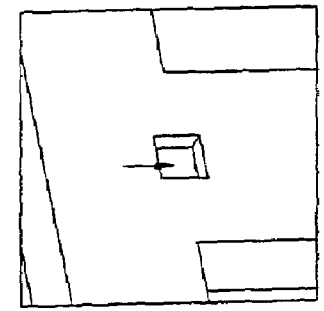

No squeeze leaves stylus free

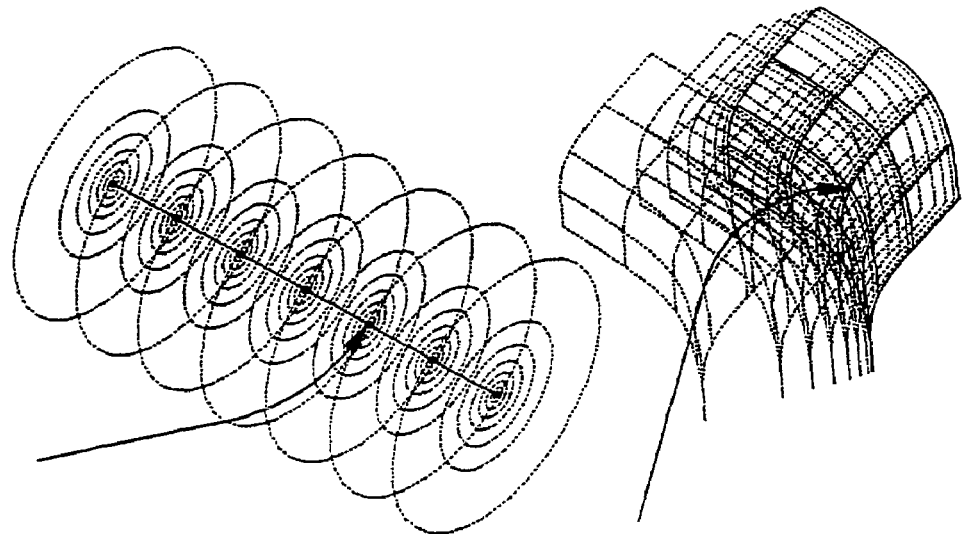
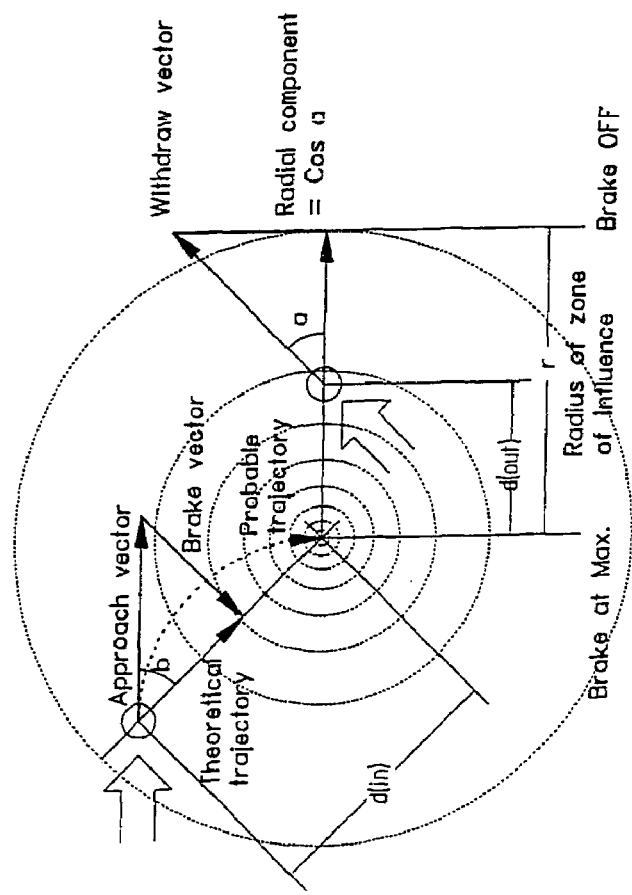
Fig. 10

HAPTIC INPUT DEVICES

FIELD OF THE INVENTION

This invention relates to new designs of haptic input devices and provides improved haptic devices that employ parallel-operating link mechanisms to enable much stiffer and lighter frameworks than conventional polar arrangements. Variants are offered to support both five and six degrees of freedom. In another aspect, this invention also relates to a means of providing force sensory feedback in a haptic device through the variable control of resistance and proposes the use of Magneto Rheological (MR) fluids to effect a simple electromagnetic proportional brake.

In yet another aspect, this invention relates to an improved stylus for haptic machines that add another proportional user input control. This can be designated to useful functions such as to enable a CAD user to rotate his model in a relative force-sensing mode and then to seamlessly move back to absolute 3D cursor positioning; or to control the extent of a stylus tool such as a virtual air-brush or gripper.

This invention also relates to a method for interpreting model data within a haptic environment when variable resistance creates the haptic device constraints.

This invention also relates to an improved 'button' arrangement which can be readily operated from any degree of stylus rotation.

BACKGROUND

The spoken word can now be recognized by computer and is the most intuitive text input method, however input of spatial data has always been subject to a poor compromise. Generally a 2D device such as a mouse is used; but it is both inadequate for 3D space and does not feedback any physical presence of objects. To the pointer the workspace is only an image.

Achieving more intuitive spatial input would enable increased design and manipulation productivity and not surprisingly has been the goal of many researchers. The class of device under consideration is known as haptic. In its perfect form, it is a type of input device that allows the user to 'feel' virtual objects as if he was touching a real model.

Currently available examples range from joysticks with some force feedback to articulating exoskeletons permitting interaction with the virtual workspace or even telerobotic control of distant robots.

There are several low cost and highly practical six axis force sensing input devices available. They are employed by CAD operators to orientate a virtual model within the workspace. But without any significant control stick displacement they are relative move only—you cannot use them to quickly find a position, you have to steer yourself there with force vector adjustments. However they are effective at selecting a model viewing position (which does not require high resolution) and being relative move permit ranging over an unlimited workspace.

Recently haptic (force feedback) devices have become available that enable absolute six axis position measurement within their working volume—which is then scaled to the size of the desired virtual workspace. Absolute position input is the most intuitive method as it maps direly to the position of the hand. The disadvantage is the finite work volume. If a CAD user needs to work in detail on a big model, it is necessary to repeatedly reset the origin or scale of the workspace, which is cumbersome.

In an ideal world the user would be able to range seamlessly between large relative displacements and fine detail absolute control.

Haptic devices generally include six axis force sensing as part of their system. They use it to sense movement intent and then enable the motion; either as freely as possible or with programmed resistance. Force feedback also enables attractive software features such as modeling compliant solids (virtual clay) and deforming complex curvature surfaces.

Special haptic devices for finger movement rather than hand movement have been developed, sometimes linked into an entire haptic exoskeleton. The trouble is that these systems are complex and costly. They also generally require that the user's body be strapped into the device. There remains a need for a more practical and cost effective solution.

Given due regard to practicality, a desirable embodiment would be a desktop pointer that can be moved about all six degrees of freedom but with it's motion limits mechanically constrained under computer control to prevent encroachment into the body of a virtual model; perhaps with a handle that can be treated like a stylus. To varying degrees this can now be technically achieved—but at a high cost, which severely limits it's adoption.

OBJECTS AND SUMMARY OF THE INVENTION

The principal object of this invention is to overcome or substantially reduce the abovementioned problems.

It is an aspect of this invention to reduce the cost and complexity of a haptic device by employing parallel link mechanisms that are stiff and light.

It is a further aspect of this invention to determine a kinematic arrangement of such mechanisms that enables a stylus to be conveniently ripped at or near the center of drag.

It is a further aspect of this invention to replace the electromotive power sources conventionally employed in haptic devices with a proportional brake that can apply spatial constraints under computer control.

It is a further aspect of this invention to employ MR fluids to effect a suitable electromagnetic brake.

It is a further aspect of this invention to mitigate the need for the usual separate force sensors by using the measured compliance or slippage rate under load to estimate the forces.

It is a further aspect of this invention to enable a single spatial data input device to allow a user to control both the position of his virtual model and his 3D cursor in an intuitive way.

It is a further aspect of this invention to apply a haptic device based on resistance control to the intuitive spatial interpretation of a virtual model.

It is a further aspect of this invention to enhance the control of telerobotic grippers.

This invention ties together several new technologies into a low cost and high performance solution to the haptic controller objective. In the following summary of the invention, Part I will describe the application of parallel link mechanisms to haptic input devices embodying the invention and Part II will describe a stylus or handle according to another aspect of the invention to be gripped and articulated by the user of a haptic input device as described in Part I.

Part I:

Parallel-operating link mechanisms such as the hexapod have a natural stiffness. They have only two links in the chain so mechanical slop does not add up. Being basically pin jointed, they work in tension or compression and have no significant bending moments. Any given set of leg lengths defines a unique position about all six degrees of freedom.

To vary the position, the legs have to vary in length. This can be achieved telescopically, but a preferred arrangement is to cause legs of fixed lengths to pass through a set of pivot points under servo control, thereby changing the effective length of the legs to their other pivot points. The motive source can then be provided at the largely stationary pivot points, so that the legs themselves can be lightweight and will consequently exhibit low inertia.

The traditional solution to building a haptic hexapod would be to treat it like a robot, with electric strut drives under closed loop control; but the technical complexity of this approach restricts the value engineering potential.

This invention proposes that instead of employing a motor to effect force feedback, a programmable brake is used instead. A type of brake that can be conveniently utilized for this purpose employs Magneto-Rheological (MR) fluids, which stiffen in the presence of a magnetic field. They are thereby controllable with a simple electromagnet.

A design objective in applying a brake to the hexapod is to permit resistance free length change of the struts and in turn six degree of freedom movement of the control handle (when unconstrained). Inertia and drag therefor have to be minimized.

This invention proposes that the struts run through a capstan or friction drive directly connected to the MR brake, ideally enclosed within the base joint of the strut.

A convenient arrangement as shown in FIG. 1 is where the capstan/brake system is built into a hemispherical shell, such that two shells can share a common pivot axis (pole to pole) to then constitute a bifurcated brake node sphere 105; and that the sphere is then held such that it is able to pivot about all three axes. A suitable joint for this purpose being a ball and socket type or a three way mechanical gimbal. The struts are allowed to pass through each hemisphere held by the capstan system and crossing as near to the sphere center as possible. The necessary small offset (as both struts cannot occupy the common focal point) does not significantly compromise stiffness or introduce measurement aberrations (because mounting errors act normal to the measured axis). As the user moves the handle, the struts change their node to node length, enabled by the capstan letting the strut pass through the hemisphere. The angle between adjacent struts also changes enabled by the relative rotation of the two halves of the bifurcated sphere and the sphere may change it's overall orientation, enabled by the socket or gimbal.

Because both struts have parallel tilt planes they can pass each other without the risk of the ends ever colliding.

Only three node points are involved (for three pairs of struts) which enables a clean triangular base with the maximum separation between nodes (compared with requiring separate nodes for each of the six struts). Bending forces in the support structure are also minimized.

The other end of the strut must also be permitted three degrees of tilt and rotational freedom. While it is possible to engineer a further bifurcated ball joint to accommodate strut pairs, the necessary joint would have to be quite large and a significant portion of the strut would have to be compromised to accommodate the scissors like strut cross over. A simpler solution is to have small individual ball and socket type joints for each strut end, but still arranged in their hexapod geometry pairs. Ideally the offset strut axis (from the hemisphere pivot point) is corrected by the offset fitting of strut to ball end.

The struts themselves need to be lightweight, stiff and able to support the loads imposed by the capstan.

A suitable style would be a hollow aluminum extrusion of perhaps elliptical section.

In one embodiment as shown in FIG. 8, the strut is held between three pinch rollers each having two, non planar contact points such as provided by V profile rollers contacting a rod. The total of 6 contact points from three rollers ensures an unambiguous and fully constrained holding position about five degrees of freedom; the sixth being the axis of the strut along which the strut can subsequently move.

The three capstan rollers are arranged with two on one side and one on the other. For convenience the brake is attached to one of the rollers only. This is advantageously the lone roller which will naturally experience the same pressure as the total of both of the rollers on the opposite side and hence be the most effective in generating friction for restraining motion with the brake applied.

In this embodiment, the brake capstan is connected by shaft to a disc (or cylinder) otherwise enclosed within the sealed compartment containing the MR fluid. It is important that the shaft diameter is minimized where a dynamic radial seal is applied to contain the fluid, as the seal will inevitably be a major contributor to any parasitic drag.

The brake disk (or cylinder) is made from a ferromagnetic material for at least it's peripheral area where it experiences the highest tangent velocities and consequently has the best torque leverage. Pole pieces are arranged to conduct the magnetic flux to either side of the disc. A coil is situated so as to generate a magnetic field in the circuit when it is electrically energized. This field, in taking the path of least resistance, flows through the MR fluid/disc/MR fluid sandwich; causing the fluid viscosity to increase and impose a restraining torque on the disc. The brake effect is directly proportional to the flux density over a useful operating range. The MR fluid will react from maximum to minimum viscosity in about 10 ms with up to 90 Kpa yield strength.

If the disc is of a larger diameter than the capstan roller, the subsequent gearing effect increases the disc's rim speed and hence it's effectiveness as a brake. But it also increases the viscous drag of the disc in the fluid and frictional drag of the seal because of the higher radial velocities. A slower and smaller disc minimizes the parasitic drag but will require a greater magnetic field strength to create the same brake torque.

The brake capstan relies on friction between its V roller and the strut. This friction can be enhanced by suitable preparation of the contact surfaces. For example Tungsten Carbide flame spraying would increase the coefficient of friction of dry metal/metal from about 0.3 to about 1.0.

The pressure across the V contact points is increased as the included V angle is reduced, for a constant roller load. This means that the effective friction can be similarly increased. The price paid is that parasitic frictional drag also increases as the contact zone engenders some skidding and the distance between strut and roller axis becomes less determinate.

As well as providing the balancing holding points, the other two 'idler' rollers can be employed for additional useful effect.

One roller can be retained on a pivot or slide which can be preloaded so as to cause a near constant contact pressure between it and the strut. This constant force reacts against the other two rollers in maintaining a force balance in the system. The pre-load travel ensures constant holding force even as the effective strut width might slightly vary or to compensate for general mechanical wear.

The other roller can be used to effect system mass counterbalancing. Without a counterbalance, and if the hexapod is largely vertical, the strut and handle system will roll through the capstans (unless held by the user). It is clearly nicer if the mechanism appears weightless and stays put wherever it is left. A perfect solution for a frictionless mechanism is possible but at some overhead. It would necessitate a counterbalance mass acting on the other side of the joint pivot, and able to move along the strut axis in compensation to any change in strut length. Because there will always be some holding friction a simpler solution is possible; the compromise assumption being that a constant force always acts in the strut axis. A watch spring can be fitted into the roller such that it provides constant torque to the roller in opposition to the torque caused by the gravitational force on the mechanism.

The capstan system has been described as having 3 rollers. When preloaded this does result in some strut bending forces. Though generally not significant, these can be minimized and the required pre-load force reduced by positioning the brake roller nearer the counterbalance roller than the pre-load roller. It cannot however be opposite the counterbalance roller because then the six roller contact points would not fully constrain the strut position.

Alternatively four rollers could be employed acting in opposing pairs. This has the advantage of avoiding bending forces in the strut, with only compression left across the strut section. Because this arrangement is over constrained with potentially eight contact points, without suitable compliance it would result in unpredictable contact pressures. One solution is to have two of the rollers offering only a single contact point (or line). They should be arranged such that each is opposite and adjacent to a V roller. The resulting six contact points again define an unambiguous and fully constrained strut axis. In such a system two of the friction rollers could be coupled to the MR brake.

To reduce the contact pressure alternative embodiments are possible employing the increased friction between suitably textured surfaces or even rack and pinion style gear contact.

An alternative embodiment to the MR brake is possible which trades off flux density required (or power of the electromagnet) with the parasitic drag felt in the free running state.

Instead of creating viscous drag simply between the fluid and a wheel as previously proposed, the MR fluid can be forced to accelerate at the point where the magnetic field is introduced such that the relative impact of the change in viscous drag will be greater. An elegant solution to this requirement is to configure the MR reservoir like a (short circuited) gear pump, with the magnetic field occurring at the interface of the two gears, from top to bottom as shown in FIGS. 3 and 4.

As the teeth mesh, fluid is forced out of the inter-tooth spaces; as they open fluid is sucked in. Theoretically no fluid passes from one side to the other (if the teeth have zero root clearance). If the fluid becomes too stiff it is like putting a jam between the gears and the brake is on.

This requires a much smaller electromagnet to activate because drag is proportional to speed; and the turbulent flow around the gear mesh will be significantly faster than the gears own tangent velocity.

Because this embodiment naturally has two axles (one for each gear) that run in opposite directions, it is consistent with running the strut between them. The 'left' side of one gear will have the same tangent vector as the 'right' side of the other, thus cooperating in moving the strut in the same direction.

In another simplified embodiment the brake disc is connected directly to a friction drive wheel, with a single counterforce wheel on the opposite side of the strut.

No further wheels are used as the tilt alignment is maintained using bushes in either end of the housing. Preload between wheel and strut is effected by coating the strut in an elastomeric material (such as synthetic rubber) and possibly also texturing or similarly coating the friction wheel. A suitable texture for the friction wheel would have to be very low profile so as not to encumber the necessary smooth rolling action.

The counterforce wheel has it's axle extended into the lower enclosed cavity where a optical codewheel can be attached whose rotation can be measured by a compatible read head module. Alternatively a low cost continuous rotation potentiometer can be attached.

This embodiment lends itself to low cost production as it has minimal metal parts and can be substantially produced from plastic injection moulded components.

The haptic control requires that the computer can determine the 6 axis absolute position of the handle.

This is possible by mathematical transform from knowledge of the relative strut pivot node positions and the effective strut lengths. The node positions are a system constant established by measurement or precise construction, strut lengths are a set of variables that have to be constantly measured.

Whereas it is possible to infer the strut length from the rotation of one of the capstan rollers, without some form of mechanical indexing this position could drift over time. A better method is to measure the strut length directly by giving it a machine readable scale, and preferably by a non-contact method that does not add to the parasitic drag.

A suitable low cost length encoder could be a reflective strip and optical read head; capacitive, inductive, magnetostrictive or magnetic encoders being options. In the case of the optical read strip, this can be of diminutive width and accommodated within the extruded strut profile on its outwards facing side. A miniature surface mount integrated read head IC can be neatly retained at a given offset to measure the scale. The reference position can be established after system power up by physically retracting (or extending) the struts to their mechanical end stops and resetting the counter.

The haptic control is also enhanced by the ability to determine the net force vector and torque caused by the user moving the handle against a resistance. In the case of the hexapod this requires that the compressive/tensile load in each strut is monitored. Many devices exist to perform this task; either based on piezo strain gauge technology or pressure sensitive variable resistors. This latter form can be as simple as laminated film with electrical contact to both sides. To determine strut load a small patch of such film can act at the bottom of a piston such that strut load acts to compress the film.

Without load measurement the haptic device would not be able to release cleanly from a software imposed movement constraint. The problem is that the system knows when to brake, but once the brake is fully on, without any relative strut motion the system cannot determine the users desire to move back into 'legal' space. Even if not fully on, the brake would make any virtual constraint appear like a sticky surface.

An alternative low cost solution to the force feedback requirement is to introduce elastic radial compliance between the friction roller and the brake. This can be achieved by several means including a radial elastomeric element in the roller's hub, or an elastomeric band as the contact interface.

In operation, the system knows at what strut length extension the brake needs to be applied. If it subsequently finds that despite applying the brake, the strut continues to change length, it can be inferred that this is due to strut load. The load will be proportional to this apparent strut length error. As the load is reduced, so the length will change back to its ideal brake point and synchronously the brake can be released such that the user can withdraw from the constraint.

In this method the resolution of load measurement is a factor of both the encoder resolution and the amount of compliance permitted. Excessive compliance will introduce a 'spongy' feel to the movement constraints. This will particularly effect the systems ability to transmit the feel of textured and hard surfaces. With a low cost linear encoder delivering perhaps 12 counts/mm (300 dpi), strut length compliance of +−1 mm will enable load at the brake point to be measured to a resolution of about +−12 counts.

If the user (or system) permits some movement by not locking the brakes completely, a more accurate strut load can be calculated from the velocity and the braking level. The exact time taken to drift by 1 count under a given brake load is a measure of the applied force. Resolution can be enhanced by averaging over a series of short time increments.

Poor resolution is not so important with a relative move force sensing device as the movement can still be smooth, it is just the rate of movement that becomes more incremental.

By knowing the strut force, movement away from a constraint is enabled by releasing the brake as soon as the opposing force is removed. This also enables the brake to work at a minimum power level when static, because it need only apply enough braking force to just oppose the load.

If the hexapod is burdened with significant parasitic drag, handle movement could feel biased by the increased drag experienced by the strut that has to move the furthest to accommodate the desired net motion. Also if the handle is offset from the center of drag, a biasing torque emanating from the drag will be experienced through any subsequent displacement. By knowing the forces in each strut, the drag contribution of each strut can be balanced by using the MR brakes to establish all strut drag at the level of the lowest common denominator—resulting in smoother bias free motion.

Knowledge of strut loads enables compliant surfaces (such as virtual clay) to be modeled. It also permits intuitive editing of complex curvature surfaces by controlling their deformation from the force level and vector established at the 6 axis pointer/model contact point.

The haptic hexapod has been described as a desktop model where it hangs from its support frame. The disadvantage of this layout is the need for the handle to be offset from the center of drag of the sub-frame in order for it to clear the articulation range of the struts.

Alternative arrangements are possible especially where the device is integrated into a bespoke control position or piece of furniture.

For example if the hexapod is inverted such that the moving platform faces upwards, and it was countersunk into a depression in a special desk top, then the struts don't interfere with positioning the handle near the ideal position of as close as possible to the platform's center. In this case any gravity balancing springs should be set to extend the leg's.

Another arrangement that mitigates the parasitic drag experienced by the 'stylus' positions the mechanism to one side of the holding position (rather than above it). The sub-frame that retains the strut end joints is formed such that it can be conveniently gripped between second finger and thumb with the index finger steadying it and otherwise available to operate 'button' switches. Forming the 'handle' with depressions on each side will enhance the grip. To minimize the possible interference of the struts with the thumb during extreme articulation, the strut joints may be raised slightly. It is an advantage if the joints are bifurcated such that they form a common vertex for two struts, as it helps to keep the sub-frame/stylus compact. The central pressure point may be fitted with a pressure sensitive transducer such that a further proportional output can be readily controlled. For example this may be employed to vary the system stiffness and perhaps then use the measured controller force vector to enhance operating features.

Where only three Cartesian axes (no torque) need to be constrained, a tripod arrangement can be used instead of a hexapod. It necessary to construct a joint where 4 struts share a common pivot point and can alter their angle with respect to each other. A further option is to employ a central fourth leg with an orthogonal end platform on which separate ball and socket joints for each of the three struts are then attached. As close as possible to each other because any displacement from the optimum common node point will cause bending moments in the fourth leg.

Another parallel mechanism architecture that lends itself to the haptic device is a 'Pentapod' as shown in FIG. 2, where only five struts act in parallel (rather than the six of the hexapod). The sixth axis (along the 'stylus' or handle) is not fundamentally so useful, but where required could then permit a wider degree of rotation than would be possible with a hexapod; by introducing a suitable encoder and brake (if wanted) effectively in series with the rest of the mechanism.

Such an architecture would look like a variable tripod with its vertex connected to (but displaced from) ideally the common vertex of two further struts with their brake nodes also suitably displaced. The tripod establishes a fixed position in space and a reference angle for the connecting spacer (from one of the struts). This requires a particularly subtle 'trifurcated' joint. The remaining "V" struts ideally share a 'bifurcated' common node joint.

When the spacer acts as the stylus, this architecture balances the parasitic drag focal point within an ergonomic handle rather than at its tip; making it less obtrusive. Similar to the hexapod embodiment where the sub-frame acts as the stylus, the Pentapod stylus is conveniently gripped between thumb and second finger, with a possible squeeze pressure sensor to provide an additional control axis.

Because the brake nodes 205a are displaced from each other, they can be plain spheres rather than 'bifurcated', making them simpler to construct. In one embodiment they are held in two axis gimbals, with the final pivot axis being common between the bases of the strut pairs. In this arrangement, the struts pivot in one axis about the common base of their subtended triangle and as such do not need to be able to rotate in their own axis. The third strut of the tripod however does need to rotate (as the stylus is tilted from side to side); a swivel element in the strut assembly accommodates this.

The mathematical transform to translate strut length into stylus position (forward transform) is generally much harder with parallel mechanisms than translating position into strut lengths (reverse transform). This is because the forward transform is not usually fully deterministic and so must be iterated. This requires subtle program techniques and a lot of processing power to undertake it in real time as is necessary with a haptic device. The Pentapod however can be forward transformed without difficulty. The tripod element yields an absolute pivot point position for one end of the stylus. The other end has a locus like a spherical shell. The other "V" frame vertex has an arc locus. There are never more than two points where an arc can intersect with a sphere. One of those points can be discounted—representing the inverted position outside of the accepted articulation range.

The above embodiments of haptic devices have been described applied as computer input devices for CAD operators. However they have many other applications.

Haptic multi axis control is helpful in the field of medical robotics and other examples of telerobotics.

While not as comprehensive as the exoskeleton approach, it is much safer and more practical. Safer because as it is only passively brake controlled, it cannot run amok under systems failure, unlike a motor powered device.

Larger hexapods with increased working volumes can be readily produced using the same design concept; potentially beyond full arm reach. This expands the application range to include sports or physiotherapy motion trainers.

Such a haptic device could be considered as a programmable exercise machine. Resistance can be established through any articulation at any level. Articulation can be constrained to programmed pathways, either with rigid boundaries or with boundaries with a graded off path resistance value. In the later case the effect would be that following the optimum path imposes minimum resistance to motion, but as you stray it gets harder. In this way the body can be trained to remember the best motion.

This could be applied to such sports as golf and tennis.

Because resistance is under programmable control it can be linked to a virtual reality simulator to enable a fully intuitive and interactive sport/leisure experience. At the entry level this could be a standard desktop device where the richness of the spatial input (compared to a mouse or joystick) enables new and more realistic game scenarios to be modeled. Specialized arrangements can be produced for arcade type theme games; an example being a boxing simulator with haptic units attached to 'gloves'. Of course the machine doesn't hit back (except perhaps with effects).

Where tilt angle or rotation articulation beyond the range of a hexapod is required by the application (such as a golf simulator), additional axes can be attached to the base or end platform of the hexapod/tripod.

The most useful extension would be a rotary brake holding the base of the hexapod, leaving the end platform lightweight. If the hexapod is not in the same axis as the rotary stage, a counterbalance weight can be employed to keep the combined system 'weightless'.

The means by which the hexapod strut lengths are varied and balanced, and the minimum node geometry also lends itself to the production of an object digitizer.

In this application a higher premium is placed on factors which define the end effector 6 axis position; such as the maintenance of constant node positions and accurate strut length measurement.

Node stability is improved by using a bifurcated ball and annular socket rather than a gimbal, and position measurement is enhanced by using a higher resolution technology such as a moire fringe based optical scale and laser read head, which can resolve sub micron increments.

In this application there is less of a requirement for a brake. Accordingly this can either be left out altogether, resulting in a manually positioned device; or replaced by a servo motor able to remotely extend or contract the struts.

Part II:

Haptic devices require a stylus or handle that the user grips and articulates. Often the handle includes finger-operated switches used much like mouse buttons to select a function or confirm an action.

In one embodiment of this invention the switches are replaced by pressure sensors and positioned such that they lie under the natural grip points of an ergonomic principally tri-lobal handle.

Other handle forms may confer the same benefits and be better suited to a particular machine geometry. The key factor is that the squeeze is measured between the thumb and second finger that together effect the principal hold on the stylus. The index finger is used to both steady the stylus (like gripping a pen) and to operate switches or a further pressure pad.

Several benefits are achieved with this arrangement.

Perhaps the most fundamental is the user's ability to employ the proportional squeeze pressure to move seamlessly between absolute and relative data input. In practice to first move his model and zoom into detail, and then to accurately position his multi axis cursor.

Without any particular squeeze, the device behaves with all the dexterity advantages of absolute position control. The harder the finger sensor(s) are squeezed, the less physical displacement of the handle is permitted by the software controlled brakes; but the measured forces are now used to increasingly control relative movement much like in the available 6 axis force sensing CAD input devices. When squeezed tight (to a soft set-up threshold) the handle position is 'locked' and any forces are interpreted as relative move output and used effectively to position the model. As squeeze is relaxed, so absolute movement is mixed with relative in an effect akin to variable scaling. When below a squeeze threshold the device has returned to direct mapping of absolute position, but now with its workspace origin moved to the new area of interest.

For viewpoint positioning (relative move) it can be assumed that the brake force is homogeneous so user input force vector can be determined from the Cartesian transformed incremental shift in position and orientation in a discreet time period * the current brake level (as set by the bulb pressure).

The user input vector has a size=(brake level)*(distance travelled in unit time D=) sqr(dx^2*dy^2*dz^2) and a direction of (a)=tan(−1)(dx/dy), (b)=sin(−1)(D/dz). Where dx, dy and dz are the changes in x, y and z values.

Torque values are similarly determined from the change in (a) and (b) in unit time * brake level.

The vector and torque are then 'reversed' and employed to move the model and workspace in a continuous relative fashion. The visual effect is equivalent to moving your viewing position.

Throughout this process, the cursor changes its absolute position in accordance with forward transformed strut length changes as before.

This process is much more intuitive and quicker to operate than separate devices to move the model and move the cursor. Also of course the cursor is now multi-axis and so can discriminate between features that overlap in 2D but are displaced in 3D.

A new simplified type of haptic device is becoming available that uses computer controlled brakes rather than motors to effect the spatial haptic constraints. There is then an issue as to how their application can best enhance the haptic experience, especially with regard to a CAD controller.

While haptic controllers have the potential to define a completely new style of CAD system, due regard must be given to enhancing the usage of current software with the minimum of alterations.

The method already proposed to integrate the movement of cursor and model falls into this category, but additional techniques can enhance the feel of selecting (and modifying) model entities.

3D CAD software is generally already able to identify points, curves, edges and surfaces as part of the tools provided for model development and editing. The object is to use the haptic feel to make this process faster and more intuitive.

When the software identifies these entities (one at a time), their spatial description can be passed to the processor maintaining the haptic controller by a serial, parallel or network data link.

Surfaces should be slippery not sticky. Therefore the brakes need to be managed to permit free movement along a surface, not just 'dig in' as soon as a constraint is reached.

For moving along planar constraints, it is first necessary to determine the speed and direction prevalent at the point of contact with the constraint surface. This is used as the 'starting vector'. Thereafter (once the brakes kick in) the true user force vector is calculated from the rate of change of strut length * the prevalent brake level for each strut at the current kinematic layout. The five vectors are summed.

The designated surface movement path is the continuation of the normal projection of the force vectors direction onto the surface plane from the current contact point. As long as the vector is not surface normal and a sufficient force level exists, the brakes can be employed 'closed loop' to synchronise the strut length changes appropriate for movement along the designated path. Of course this path can change direction (while still constrained to the plane) as the users force vector changes direction.

A reverse kinematic transform determines the changes in strut lengths consistent with following the path (at an estimated displacement for one time unit based on the available force component). If a strut's actual length varies from the transforms estimated length, the brake level is amended to correct the error for the next position check. The rate of movement can be optimised by reducing synchronised braking up to the point where one axis has a zero brake level.

Hardness, coefficient of friction and texture are possible further parameters.

The reverse transform calculates the strut lengths from the stylus node locations, and then for each strut, length=sqr $(dx^2*dy^2*dz^2)$. Where dx, dy and dz are the node displacements from the brake pivot points in x, y and z.

The correct application of brake force can guide the cursor into a point position and hold it there. Essentially the same solution can be employed as for surface constraints. Only in this case as the cursor approaches within a defined range of the target point (or line), a straight line path is determined to the trap point (or the normal to the line). Again the brakes are synchronised to steer the stylus/cursor along this path.

The 'feel' comes from the decay term that specifies the overall correction brake levels and the trap size limits. At maximum range there is no correction braking. As the target is approached, brakes are exponentially increased until they can fully control the pathway. When first within range they will feel 'soft' and hence cause the path to gently curve in towards its target rather than sharply change direction.

Applied brake level=max brake force*exponential decay term.

With the exponential decay term in the form 1−sqr(2rd−$d^2$)/r with r=radius of max influence, d is the offset from point If the users force vector moves such that the normal (escape) component exceeds a defined threshold then the trap is released. The release could also be exponential as defined by a decay term.

The same technique of using a decay term and withdraw threshold could be employed with lines or surfaces to produce a linear or planar trap. in one embodiment the squeeze sensor is arranged like a continuous radial band around the stylus. The advantage is that it can be operated at any degree of rotation of the stylus in it's own axis.

To enhance control feel, the band should exhibit compliance proportional to squeeze force. Also the band can be arranged to generate a bigger effect if squeezed around its center than at its edges, enabling either coarse or high fidelity control depending on how it is gripped.

The band can be like a radial or toroidal bladder such that compressing it causes an increase of pressure within its reduced volume; or the displacement of a fluid. Because gases expand significantly with a change of temperature (likely with a hand held device) they would need subtle temperature compensation for applied pressure to be consistently measured (Boyle's Law: $P1V1/T1=P2V2/T2$). A fluid filled device may therefore be preferred.

Such a fluid filled radial bladder can displace fluid into a further bladder arranged at the axis of stylus rotation. The displacement of this further bladder can then be measured using non-contact sensing from the non-rotating side of the stylus, thereby avoiding wiring problems associated with enabling continuous stylus rotation. A suitable sensor could be optical, capacitive, inductive, LVDT or magnetic. In the latter case the axial bladder retains and consequently displaces a small magnet, and a proportional Hall effect sensor measures the changing flux density—the voltage level output then indirectly reflects the system pressure.

An alternative 'solid state' solution can be based on a displacement sensor that directly measures outer bladder displacement irrespective of the position of the pressure contact points. This can be implemented by employing an electrically conductive band underneath the compliant radial bladder but with the bladder elastomer filled with ferro'ferro-magnetic particles. As the bladder is squeezed so the system capacitance will change and can be measured. Alternatively an electrically conductive elastomer can be used with a contact slip ring deployed to measure capacitive charge between ring and bladder.

Proportional squeeze measurement can also be employed to assist telerobotic control as a much more practical compromise than a full exoskeleton type device.

In a typical embodiment the squeeze sensors control the action of a gripper device or other robotic end effector. This is again intuitive, being like gripping an object between fingers and thumb.

Just as the squeeze sensor can be circumferal around the stylus, so can additional function buttons. In this case a 'ring' can be located conveniently for index finger operation. Pushing the ring causes one switch state, pulling the ring back causes another. The feel is enhanced if the 'button ring' has a preferred home position to which it will return unaided; a force threshold to activate and exhibits a significant physical displacement but with minimal friction. These preferences can be accommodated by supporting it using a small elastomeric "O" ring as an annular bearing roller. The ring rests in matching depressions on the button side and the inner core. To displace the button the ring needs to compress in order to roll out of its depressions, however once out the preference to return to its moulded orientation will provide some back force to roll it back (into its off state).

The button ring can be extended inwards with a radial flange such that its displacement can be measured at any stylus axial rotation. Simple electrical contact can be employed, but a preferred non-contact and solid state embodiment is to make the flange ferromagnetic or magnetic such that its displacement can be sensed with a Hall sensor. If the flange comprises of annular and adjacent North and South polarities, when the sensor is between them it will have no relative output voltage, but will change positive or negative depending on which way it is subsequently displaced.

If the "O" ring groove is redesigned to act as a self-centering return spring without a strong home position bias, the user may re-dedicate it as a further proportional output reading the sensors proportional value rather than employing push and pull switch point thresholds.

Even if always used only as buttons, proportional sensing may still offer advantages. Finger contact can be maintained at all times and without any mechanical force threshold there will be minimum spatial disturbance when enabled. Also it is not hard for the user to select and enable more than one unambiguously definable displacement state.

Instead of a bladder or similar which exhibits relatively small compliance, lever extended finger operated return sprung displacement transducer can be employed. This is particularly advantageous for telerobotic applications where fine positional fidelity is enhanced by having an increased displacement range. It also opens up the possibility to give the transducers a haptic force feedback capability, perhaps in proportion to the resistance experienced by pressure sensors on the robot gripper or otherwise determined by the virtual reality environment. In effect the fingers/thumb displacement would define the gripper displacement and when the gripper felt an obstruction so would the fingers/thumb.

This design needs to support the new ergonomics of the finger/thumb contact pads being somewhat displaced from each other in their resting position, and then coming together as the sensors are depressed. It is convenient to enable the handle to be principally held by the palm and the two end digits, with, the thumb, index-and middle finger resting against the haptic displacement sensors. The robot gripper will then advantageously emulate the same kinematic design.

A BRIEF DESCRIPTION OF THE DRAWINGS

In order that the present invention may be well understood, various exemplary embodiments will hereinafter be described by reference to the accompanying drawings, wherein:

FIGS. 2A and 2B show embodiments of a pentapod based haptic input device;

FIGS. 3A and 3B are schematic plan and elevation views of a gear pump based brake mechanism useful in a haptic input device embodying the present invention;

FIGS. 7A and 7B show assembled and exploded views of an alternative trifurcated joint;

FIGS. 8A and 8B show schematic plan and sectional elevation views of bifurcated sphere brake used in the hexapod based haptic input device of FIG. 1;

FIG. 9 shows a conceptual outline, illustrated by four examples, of the transition between relative model (or viewpoint) move and absolute position control in use of a haptic stylus embodying the present invention;

FIG. 10 shows how to trap a virtual entity with a resistance based haptic device;

DETAILED DESCRIPTION OF THE EMBODIMENTS

FIG. 1

Figure 1:
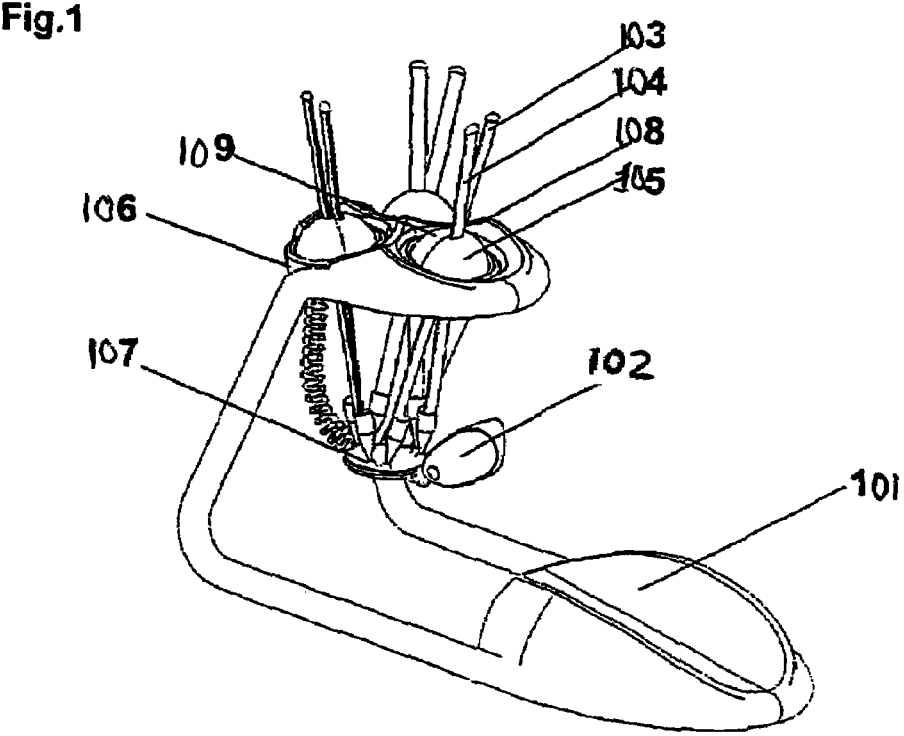
FIG. 1 shows an embodiment of a hexapod based haptic input device.

Shows an embodiment of hexapod based haptic device. Movement of the stylus 102 causes the struts to change their lengths between their end linkages 107 and their supporting hemispheres 105 by passing through the hemispheres and extending out behind. The mix of strut lengths defines the stylus position 106 in axis space.

101. Shows an ergonomic arm rest, sloping upwards towards the stylus to elevate and support the wrist.

102. Shows an embodiment of a tri-lobal stylus that is attached to the hexapod end frame by a coupling that can be locked off at the users preferred ergonomic angle.

103. Shows a representative strut connected universally to the hexapod end frame and passing through a hemisphere 109.

104. Shows another representative strut passing through the hemisphere 105 and sharing a pivot axis with hemisphere 109.

105. Shows one of the hemispheres that supports the axial displacement of the struts, can measure the effective strut lengths and houses the brake mechanism.

106. Shows a 3 axis gimble that permits the hemispheres to rotate individually about their common axis, and as a pair to tilt and rotate.

107. Shows a ball and socket linkage that connects the strut end to the hexopod end frame.

108. Shows the frame that supports the gimbles.

FIG. 2A

Shows an embodiment of pentapod based haptic device. Movement of the stylus 202a causes the struts to change their lengths between their end linkages 203a or 204a and the brake node spheres 205a. The mix of strut lengths defines the stylus position in 5 axis space. The axis not supported is the axis of the stylus between linkages 203a and 204a, but this can be independently measured if needed.

201a. Shows an ergonomic arm rest

202a. Shows the stylus supported between the linkages 203a and 204a.

203a. Shows a linkage that permits 2 struts to have a common pivot axis and as a pair to articulate about three degrees of freedom with a common pivot point.

204a. Shows a linkage that performs as 203a, but also supports a third strut 207a sharing the notional common pivot point and able to rotate about its own axis and till independently in one axis with respect to the stylus. This strut 207a establishes a reference angle for the stylus when rotating about its own axis (the devices $6_{th}$ degree of freedom).

205a. Shows a brake sphere that permits the strut to pass through it, can measure the effective length of the strut, and houses the brake mechanism.

206a. Shows a representative 2 axis gimble that supports the brake spheres.

207a. Shows a representative strut. This one also establishes the reference angle for stylus rotation.

208a. Shows the frame that supports the gimbles.

Figure 2A:
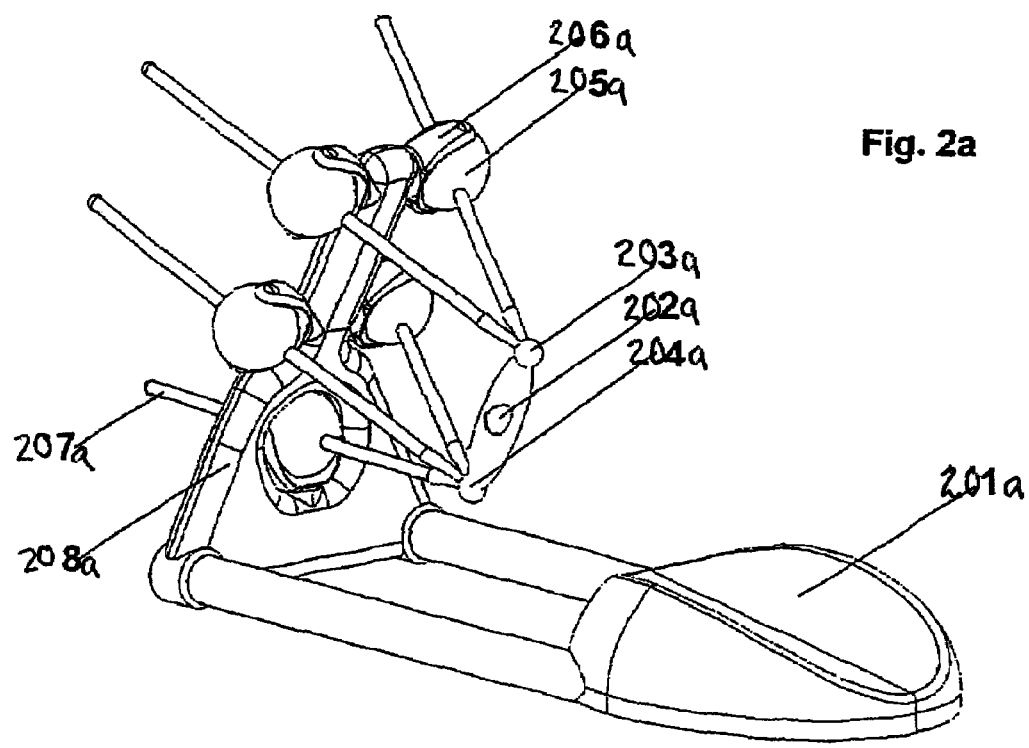

In another embodiment of a pentapod based haptic device shown in FIG. 2B, the brake nodes 201b are supported by a ring gimble 202b rather than a one sided yolk. The ring can be supported more stiffly with two stub axles and with less strain on the mounting frame 203b. The mounting frame also circumscribes the brake nodes rendering them less liable to accidental damage.

Figure 3B:
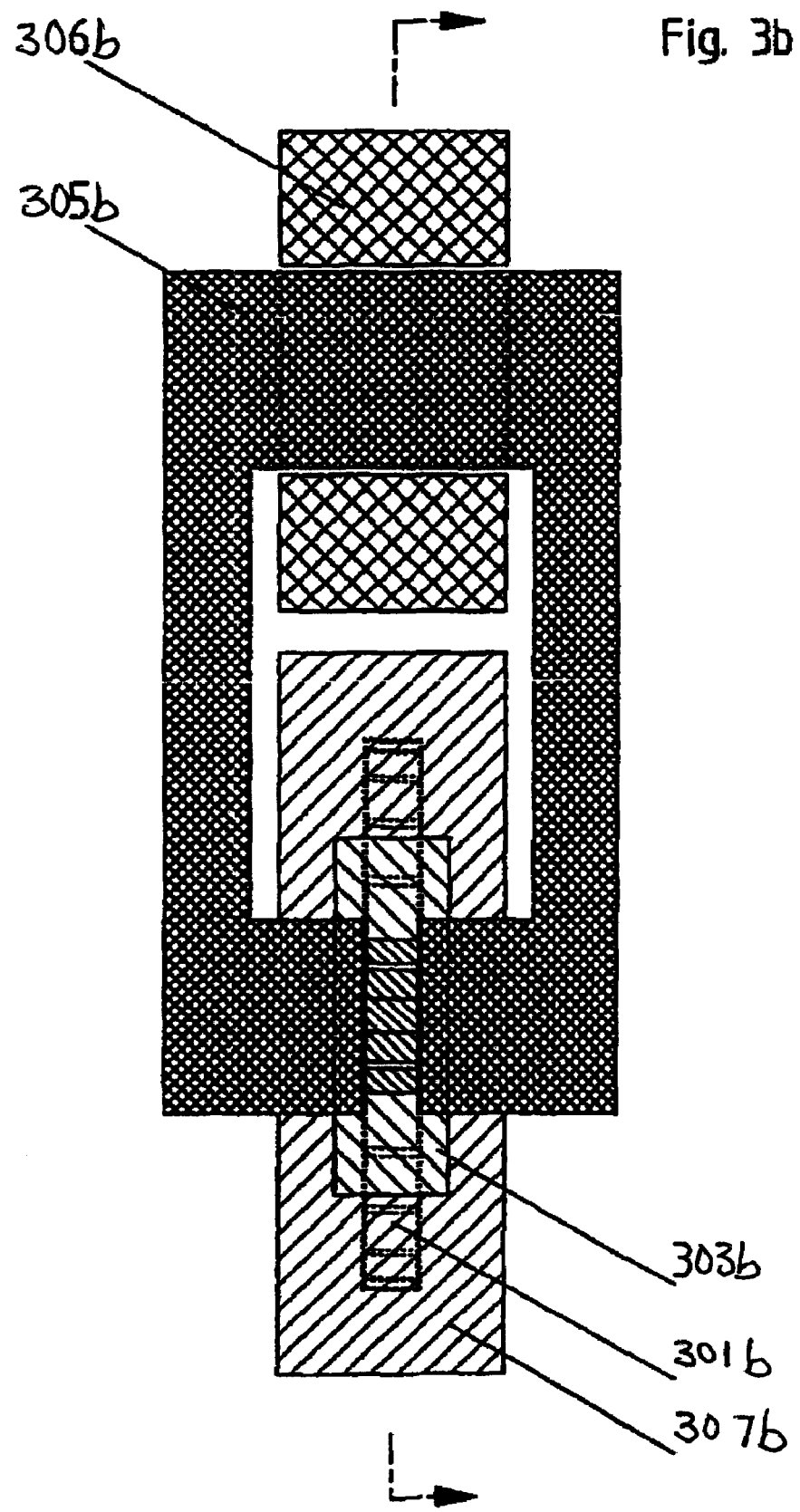

FIGS. 3A and B

Shows a conceptual embodiment of a gear pump based brake. The gears (e.g. 1) run in a cavity otherwise filled with MR fluid. A pocket in the cavity 303a effectively short circuits the pump flow, but fluid still fills the gear mesh zone 304a. An electromagnet 306a can proportionally generate flux that flows along the conductors 305a and is focused across the gear mesh zone. In so doing, it can vary the local viscosity and hence the ability of the fluid to evacuate the inter gear spaces as the gears revolve. This braking effect is output via the gear axle shafts.

301a and 301b. Shows a representative gear.

302a. Shows the MR fluid

303a and 303b. Shows the pocket in the cavity that enables the flow generated by the pump to circulate.

304a. Shows the area above and below the gear mesh zone where the flux conductor (5) is focused.

305a and 305b. Shows the flux conductor that transmits the magnetic field from the coil to the focused poles on either side of the gear mesh zone.

306a. Shows the coil.

307a and 307b. Shows the housing.

308a. Shows the gear axles.

FIG. 4A

Shows an embodiment of a gear based brake installed in a unit able to support a strut between pinch rollers 407a with 2 of the roller axles connected to the brake.

The magnetic flux circuit comprises of end cap 401a, core 402a and end plate 403a. One of the idler roller axles extends into the cavity afforded by end shell 409a where it is attached to an encoder wheel as a means to measure the extension of the strut.

401a. Shows the end cap made out of a magnetic flux conductor.

402a. Shows core magnetic flux conductor.

403a. Shows the end plate magnetic flux conductor.

404a. Shows the coil.

405a. Shows a representative gear.

406a. Shows the housing that supports the axles and provides the bi-lobar cavity in which the gears run.

407a. Shows a representative pinch roller on its axle.

408a. Shows the bearing plates that support one end of the axles.

409a. Shows the end shell that houses a radial encoder attached to one of the idler axles.

Figure 4A:
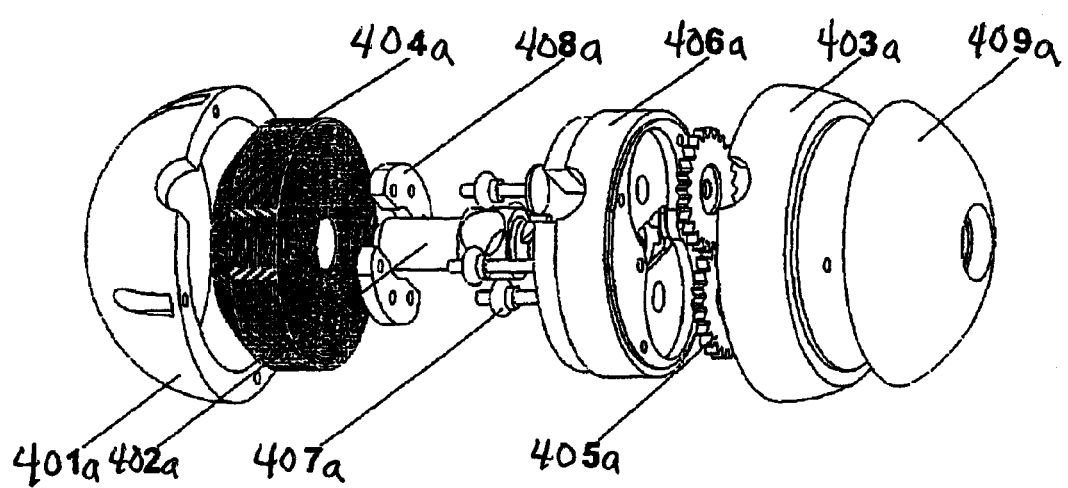
FIG. 4A shows an exploded view of another gear based brake mechanism.
Figure 4B:
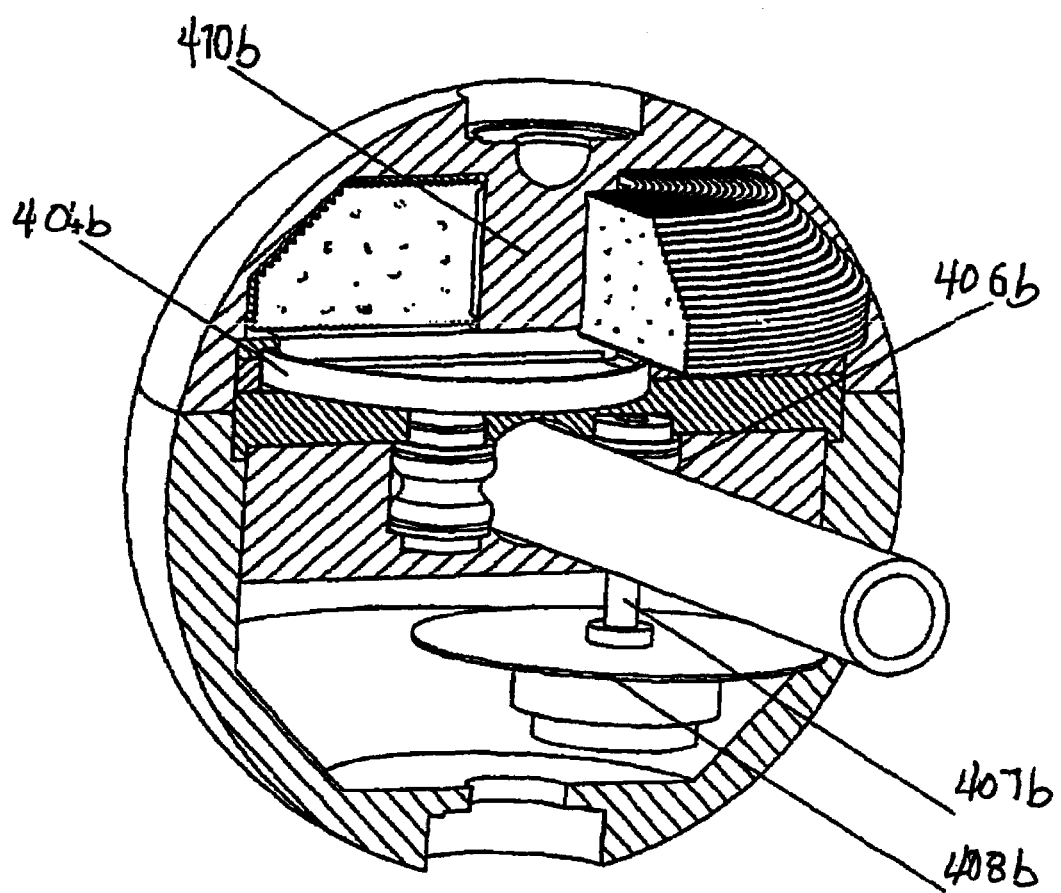
FIGS. 4B and 4C are sectional and exploded views of a strut axial brake unit.
Figure 4C:
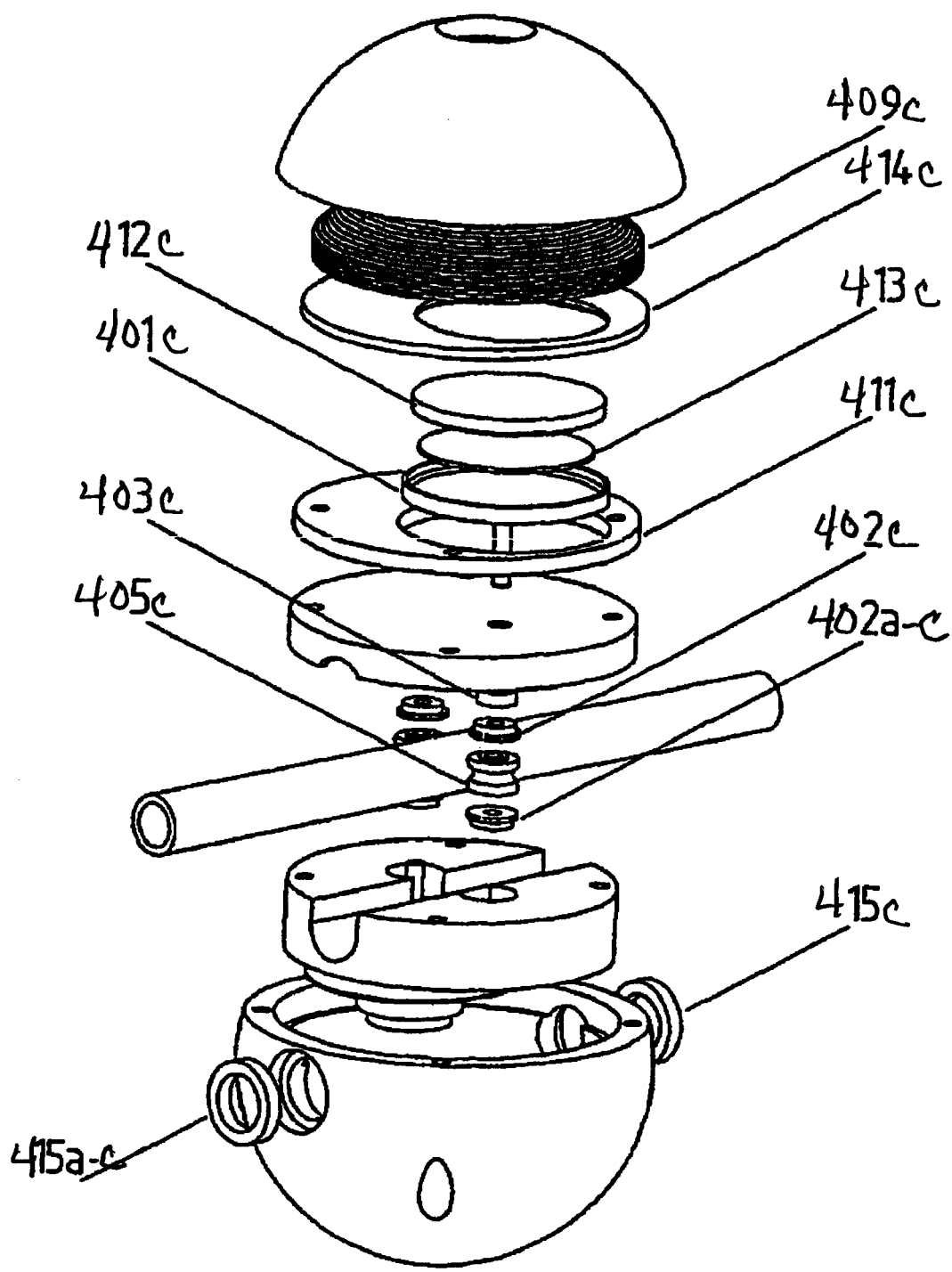
Figure 5:
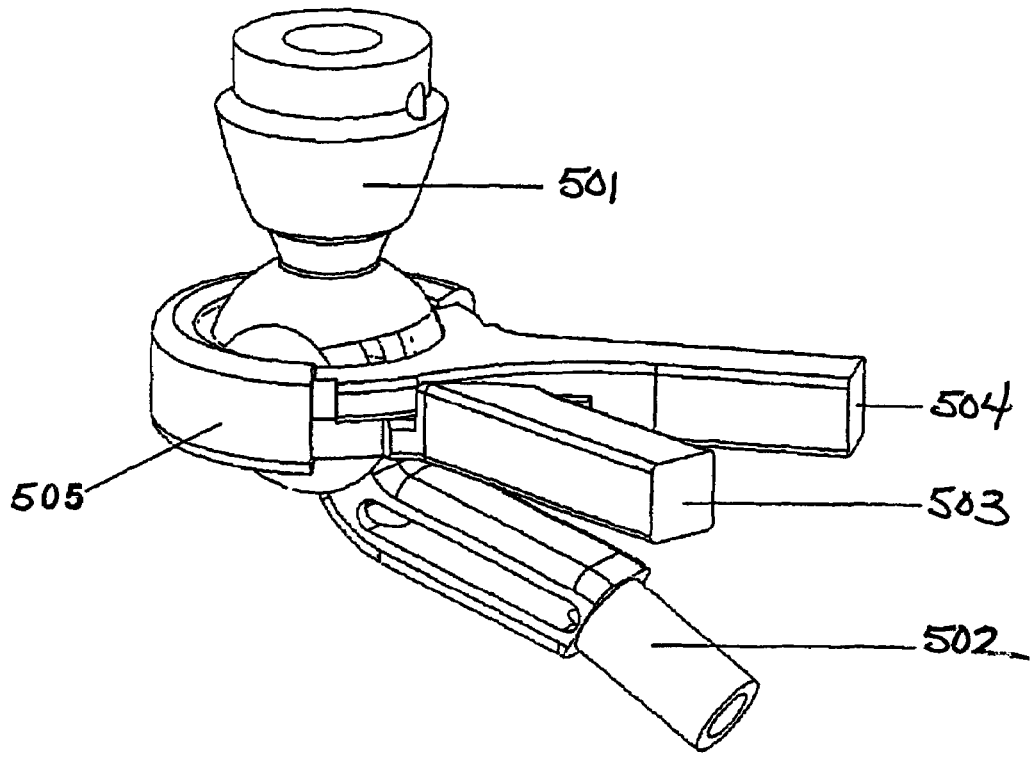
FIGS. 5 and 6 show assembled and exploded views of a trifurcated joint useful in the pentapod embodiments of FIGS. 2A and 2B.

FIGS. 4B and 4C show a section and exploded view of an embodiment of a strut axial brake unit.

The brake employs a disc 401c supported on its shaft by bearings 402c, 402a-c with a seal 403c trapping the MR fluid in a radial volume 404b, 404c offering a small clearance around the disc. The shaft retains a friction wheel 405c. The opposing wheel 406b, 406c is similarly supported, but with its shaft 407b, 407c extending down to retain a codewheel 408b, 408c.

The coil 409c drives a magnetic circuit that sees the flux pass through the core 410b 410c, around the hemisphere and then through the conductor plate 411c, through the first layer of MR fluid then through the cylindrical rim of brake disc 401c, through another layer of MR fluid and into pole piece 412c which is connected to the core 410b, 410c.

An insulator disc 413c is recessed into the pole piece 412c to encourage the flux to pass through the brake disc rim where it has the best brake leverage rather than through its centre.

A seal plate 414c is employed to seal off the coil compartment from the MR fluid.

Bushes 415c, 415a-c help guide the strut though the pinch wheels.

FIG. 5

Shows an embodiment of a 'trifurcated' joint. A linkage that permits 2 struts 503, 504 to have a common pivot axis and as a pair to articulate with three degrees of freedom about a common pivot point and with a third strut 502 sharing the same notional pivot point able to tilt independently in one axis with respect to the reference ball end 501.

The assembly is held together and pre-loaded by the clip 505 that retains the annular socket rings attached to 503, 504 around the ball end 501 and thereby traps the pivot strut 502.

Figure 6:
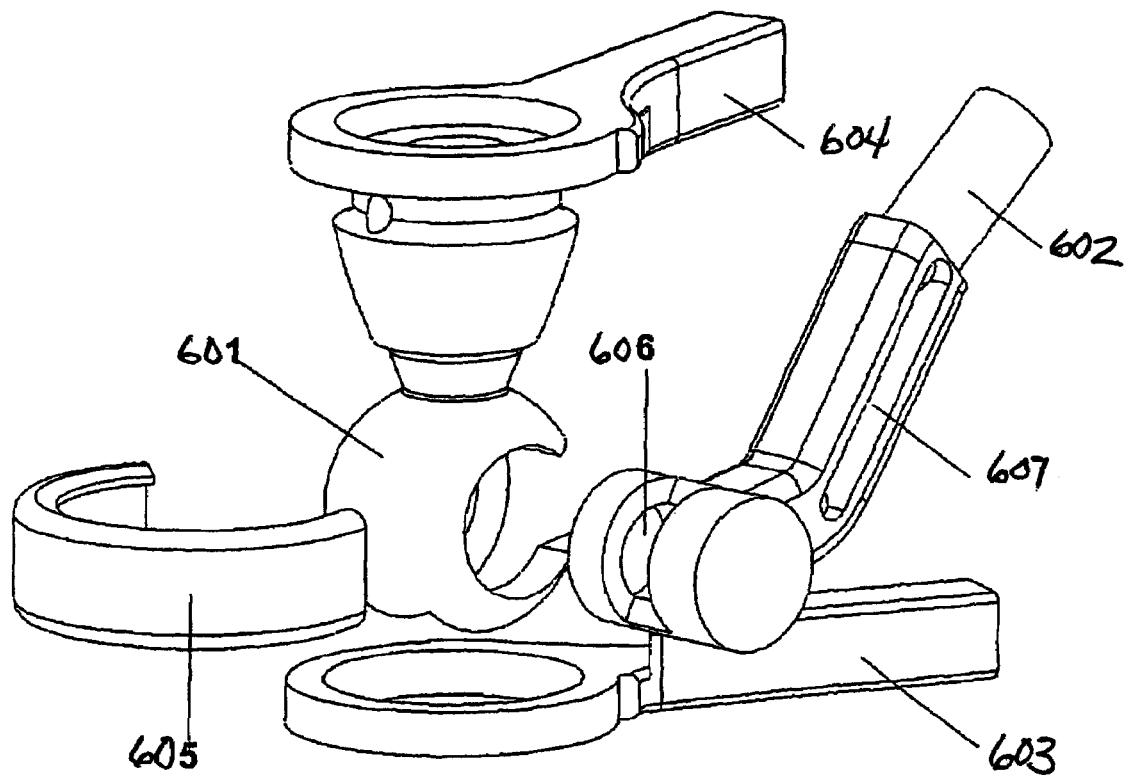
Figure 11:
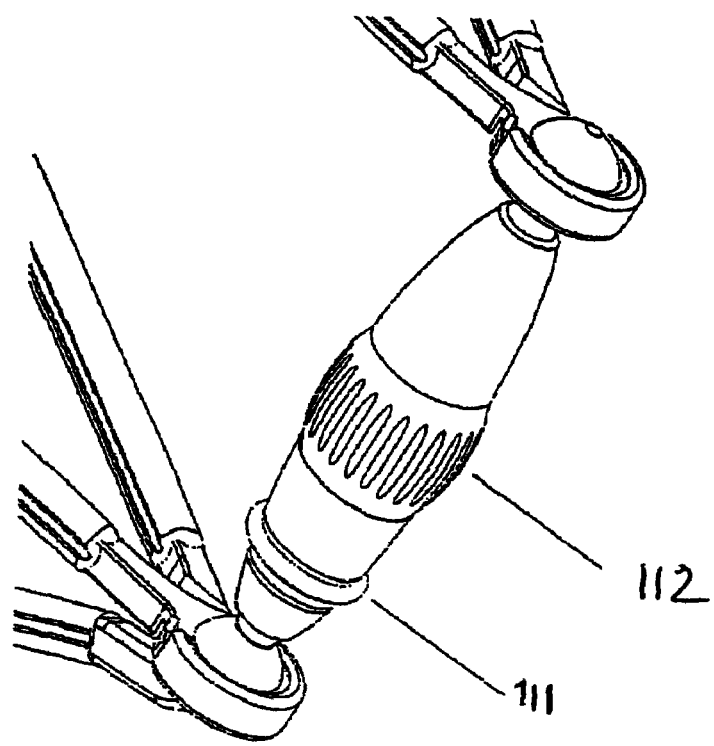
FIG. 11 shows the haptic stylus of the pentapod based haptic input device of FIG. 2B.
Figure 12:
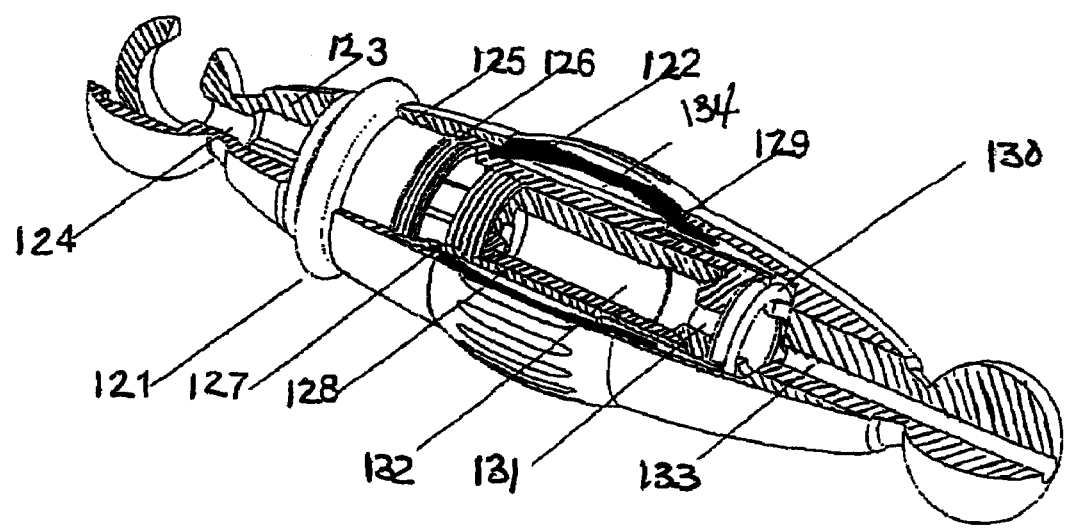
FIG. 12 is a part sectional view of the haptic stylus of FIG. 11.

FIG. 6 shows the same assembly in exploded view.

Electrical wires can pass through the linkage by running down a hole through the ball end and escaping through the hollow strut 602 via slots 606 and 607.

601. Shows the ball end

602. Shows the strut that can only pivot in one axis with respect to the ball end.

603. Shows a strut and annular socket component, partially cut away to permit the overlap with its adjacent strut component 604.

604. Shows a copy of part 603, turned upside down.

605. Shows the clip that preloads parts 603 and 604 together

606. Shows the slot that allows electrical wires to pass from the ball end into the strut 602. It is long enough to permit strut pivoting.

607. Shows the slot that enables electrical wires to be threaded through from slot 606 to the hollow core of the strut 602.

FIGS. 7A and 7B show perspective and exploded views of a simplified embodiment of a "trifurcated" joint wherein the lower leg 701 that joins the ball 703 with a one axis pivot is retained with a pin 702. This leaves more of the ball's natural surface to retain the socket rings, however the pivoting strut cannot practically be used as a conduit for wiring.

FIGS. 8A and 8B show a plan view and section of bifurcated sphere brake as employed by the hexapod based (FIG. 1) haptic device.

The strut is held between 3 pinch rollers. One 803b is connected to a flywheel otherwise immersed in an MR fluid bath. Another 804b houses a 'watch' spring such as to counteract the mass of the strut and stylus system. The final one 805b is preloaded against and along an annular "V" groove such as to maintain a suitable working pressure to grip the strut.

801a, 801b. Shows the elliptical section strut with spring steel wire runners 802b bonded on either side.

802b. Shows the end section of a spring steel runner.

803a, 803b. Shows the main pinch roller that extends inwards on a narrow axle to become the brake flywheel.

804a, 804b. Shows the idler roller that has a facility to house a constant force spring.

805a, 805b. Shows the idler roller that cab be sprung loaded to provide for constant pinch pressure of the roller set about the strut.

806a, 806b. Shows the inner hoop of the 3 axis mounting gimble.

807a, 807b. Shows the outer hoop of the axis mounting gimble.

808a, 808b. Shows the gimble ring preload collar that is screwed into the outer hoop 807a, 807b and causes bearing balls to be trapped in the interface between 806a, 806b and 807a, 807b.

809b. Shows the possible location of an optical transducer chip able to read the displacement of a linear scale otherwise attached to the strut.

810b. Shows the spacer balls separating the two hemispheres.

811b. Shows the moulding on which the rollers are mounted.

812b. Shows the plate that transmits the magnetic flux from the shell 815b to the outer rim of the brake disc.

813b. Shows the potting fluid used to isolate the MR fluid reservoir.

814b. Shows the coil.

815b. Shows shell that transmits the magnetic flux to plate 812b.

816b. Shows the pole piece that transmits the magnetic flux to the inside of the rim of the brake disc.

817b. Shows the MR fluid in its cavity.

FIG. 9

Shows a conceptual outline of the transition between relative model (or viewpoint) move and absolute position control.

Example 1 illustrates how the cursor follows the stylus position and orientation in an absolute move relationship when no squeeze is registered by the stylus.

Example 2 illustrates that when a small degree of squeeze is applied (in turn lightly applying the haptic brake) as the stylus is tilted, the cursor still follows the stylus absolute position, but the model is caused to rotate as a reaction to the applied force vector.

Example 3 illustrates that when severely squeezed, stylus (and hence cursor) movement is minimal, while the force vector applied by the user trying to move the stylus is interpreted to move the model.

Example 4 illustrates that once the squeeze has been released, the stylus once again moves the cursor with an absolute relationship—just the model is now in a new position.

FIG. 10

Shows how to trap a virtual entity with a resistance based haptic device.

On approaching the desired point or curve, the controller applies a brake vector to bend the approach vector normal to and towards the ideal theoretical trajectory. This corrective force increases as the cursor gets closer to its target (established by the exponential decay term), and/or as the approach vector is displaced from the ideal radial trajectory. The cursor will then be retained at the target with the designated maximum brake force.

On withdrawing from the 'trapped' position, the algorithm applies a brake vector to resist the radial component of the withdraw vector, and with the retaining force diminishing up to the radius of the zone of influence (as established by the exponential decay term).

The side illustrations show how the cursor trajectory can be modified by the haptic brake to steer the cursor towards a curve or surface feature. Once there the cursor will be able to slide along the feature, resisted from 'escaping' by the cosine brake component and attracted back in by the sine brake component.

FIG. 11

Shows an embodiment of a stylus held between two multistrut spherical bearings.

111. Shows a ring style button control. The ring can move axially backwards and forwards defining button 111 and button 112. It can be operated from any degree of stylus rotation (in its own axis).

112. Shows the externally ellipsoidal sqeezable bulb, again operable from any degree of stylus rotation.

FIG. 12

Shows a view of the stylus with some component parts sectioned.

121. Shows the button ring with its cylindrical collar.

122. Shows the squeezable bulb otherwise trapping fluid in volume 134.

123. Shows the core of the stylus that is constrained by it's coupling from rotating, continuing on as 128.

124. Shows a channel through which the stylus signal wires can pass.

125. Shows a collar that supports the ring button.

126. Shows an "0" ring that can roll within an annular groove, acting as a bearing to support the ring button.

127. Shows the screw in plug that retains the rotating elements to the core and onto which can be mounted the passive side of an angular encoder.

128. Shows the extension of the core 123 with external annular bearing strips to support the rotating part of the component set.

129. Shows a section through one of the channels enabling fluid to pass from the cavity 134 to the region behind the bellows 130.

130. Shows the bellows that retains a passive position sensing element 131 on its dry side and that can expand outwards when fluid pressure increases.

131. Shows the position of a cylindrical magnet acting as a piston connected to the bellows 130.

132. Shows the cavity where a linear position sensing device can be accommodated; in this embodiment it would be a Hall sensor to measure the offset distance of the piston magnet.

133. Shows a convenient channel for filling the fluid, and subsequently adjusting the physical feel by screwing in a plug and set screw to effect some preload.

134. Shows the volume under the squeeze bulb that would be filled with fluid.

Having described the invention in the foregoing by reference to specific embodiments, it is to be appreciated that the embodiments are exemplary only and that modifications and variations could be made without departure from the spirit and scope of the invention as set forth in the appended claims.

For the avoidance of doubt, reference herein to parallel link mechanisms is not to be understood as indicating that the links are geometrically in parallel. Rather, the links cooperate with each other and work in parallel to determine the positions of machine nodes, in contrast to serial link mechanisms wherein each link itself defines a machine node by virtue of its disposition relative to a preceding and/or succeeding links.

The invention claimed is:

1. A haptic device comprising:
   at least five axially moving struts, together forming a parallel link mechanism, each strut having a first end and a second end;
   a frame comprising a plurality of brake nodes, each mounted in ball-and-socket manner in the frame, each brake node constraining axial movement of at least one of said struts that passes by sliding movement through the brake node;
   a haptic stylus supported by each second end of each said strut;

wherein the struts pass through said brake nodes with sliding axial movement and wherein force feedback is effected by proportional control of brakes in the brake nodes, constraining sliding axial movement of the struts through their corresponding brake nodes, and wherein the haptic stylus moves with at least five degrees of freedom and gives force feedback in three dimensions.

2. A haptic device as claimed in claim 1, where the brakes are effected by causing MR fluid to change its viscosity by adjusting a magnetic field.

3. A haptic device as claimed in claim 2, wherein the MR fluid acts between the rim of a rotary disc and its housing, the disc axle extending out of a fluid filled cavity and retaining a friction wheel that acts capstan-like against the axial motion of a strut.

4. A haptic device as claimed in claim 2, where the MR fluid is in a cavity containing meshing gears and an electromagnet is arranged to create a magnetic field across the gear mesh zone that can be adjusted to adjust the viscosity of the fluid and in turn adjust the resistance to rotation of the gears.

5. A haptic device as claimed in claim 1, comprising a ball end around which two annular sockets attached to struts are clamped by virtue of a partial snap-on ring with opposite inwards faces, the gap between these faces being sufficient to accommodate the two annular socket rings back to back.

6. A haptic device comprising:
- at least six axially moving struts, together forming a parallel link mechanism, each strut having a first end and a second end;
- a frame comprising three brake nodes, each mounted in ball-and-socket manner in the frame, each brake node constraining axial movement of first respective ends of at least two of said struts that pass by sliding axial movement through each brake node; and
- a haptic stylus supported by each second end of each said strut;
- wherein each brake node further comprises a pair of hemispherical parts together forming a sphere and wherein each hemisphere supports at least one of the struts and allows the strut to pass through it,
- wherein force feedback is effected by proportional control of brakes constraining axial movement of the struts through their respective hemispheres, and
- wherein the haptic stylus moves with at least five degrees of freedom and gives force feedback in three dimensions.

7. A haptic device comprising:
- at least five axially moving struts, together forming a link mechanism that moves in parallel, each strut having a first end and a second end;
- a frame comprising a plurality of brake nodes, each brake node constraining axial movement of at least one of said struts that passes by sliding movement through the brake node;
- a haptic stylus supported by each second end of each of said struts; and
- wherein the struts pass through said brake nodes with sliding axial movement and wherein force feedback is effected by proportional control of brakes in the brake nodes that constrains axial movement of the struts through their corresponding brake nodes, and wherein the haptic stylus has a position defined in at least 5 axis space and gives force feedback in three dimensions.

* * * * *